United States Patent [19]

Atwood et al.

[11] E Patent Number: Re. 32,044

[45] **Reissued Date of Patent: * Dec. 3, 1985**

[54] CATALYST FOR STEAM REFORMING OF HYDROCARBONS

[75] Inventors: Kenton Atwood, New Albany, Ind.; James H. Wright, Louisville, Ky.

[73] Assignee: United Catalysts, Inc., Louisville, Ky.

[ * ] Notice: The portion of the term of this patent subsequent to Nov. 11, 1997 has been disclaimed.

[21] Appl. No.: 624,923

[22] Filed: Jun. 27, 1984

Related U.S. Patent Documents

Reissue of:

[64] Patent No.: 4,337,178
Issued: Jun. 29, 1982
Appl. No.: 201,992
Filed: Oct. 29, 1980

U.S. Applications:

[63] Continuation-in-part of Ser. No. 024,005, Mar. 26, 1979, Pat. No. 4,233,187, which is a continuation-in-part of Ser. No. 817,160, Jul. 20, 1977, abandoned, and Ser. No. 708,941, Jul. 27, 1976, abandoned.

[51] Int. Cl.[4] ..... B01J 21/04; B01J 23/74

[52] U.S. Cl. ..... 502/335; 502/325; 502/332; 502/337; 502/527; 252/373

[58] Field of Search ..... 502/325, 332, 335, 337, 502/527; 252/373

[56] References Cited

U.S. PATENT DOCUMENTS

| | | | |
|---|---|---|---|
| 3,119,667 | 1/1964 | McMahon | 252/373 X |
| 3,201,214 | 8/1965 | Fox et al. | 48/214 A |
| 3,359,215 | 12/1967 | Reitmeier | 252/477 R |
| 3,502,596 | 3/1970 | Sowards | 252/477 R |
| 3,518,055 | 6/1970 | Egashira et al. | 252/373 X |
| 3,776,859 | 12/1973 | Simpson | 252/462 |
| 4,207,211 | 6/1980 | Russ et al. | 252/466 J |

FOREIGN PATENT DOCUMENTS

| | | | |
|---|---|---|---|
| 7532280 | 10/1975 | France | 252/373 |

*Primary Examiner*—W. J. Shine
*Attorney, Agent, or Firm*—William R. Price

[57] ABSTRACT

An improved catalyst is described which comprises a normally cylindrical refractory support having gas passages communicating from end to end and oriented parallel to its axis and having gas passages in the shape of segments of circles (pie-shaped), square, hexagonal, circular, oval or sinusoidal. The exterior and interior surfaces are coated with catalytic compositions. The length of the refractory support is significantly less than the diameter. Further, there is a definite ratio of height to effective internal diameter (H:ID) of each of the gas passages. These catalysts are especially effective for endothermal reactions because both the internal and external surfaces of the support are coated with catalysts and are more efficiently heated. This is especially true for the internal surfaces of the support (i.e., the walls of the axially oriented gas passages) which heretofore have been shielded from the infra-red rays radiating from the tubes of the catalytic reactor. Thus, heat transfer to the catalyst surface is more effective in maintaining the interior surface at the desired elevated reaction temperature. The structures are especially effective for the steam-hydrocarbon reforming reaction, particularly when the hydrocarbon is in the boiling range of naphtha or below.

7 Claims, 8 Drawing Figures

CATALYST FOR STEAM REFORMING OF HYDROCARBONS

Matter enclosed in heavy brackets [ ] appears in the original patent but forms no part of this reissue specification; matter printed in italics indicates the additions made by reissue.

CROSS REFERENCE TO RELATED APPLICATION

This application is a Continuation-In-Part of our Co-Pending application entitled CATALYST AND PROCESS FOR STEAM REFORMING OF HYDROCARBONS, Ser. No. 024,005, Filed: Mar. 26, 1979, now U.S. Pat. No. 4,233,187, which was a Continuation-In-Part of our Co-Pending application entitled STEAM HYDROCARBON REFORMING PROCESS, Ser. No. 817,160, Filed: July 20, 1977, now abandoned, and of our co-pending application Ser. No. 708,941, Filed: July 27, 1976, now abandoned.

FIELD OF THE INVENTION

This invention relates to an improved geometric configuration for a catalyst support which is especially effective and efficient when employed for endothermal reactions. It is more particularly applicable, especially when coated with nickel promoted with the oxides of iron and manganese, such as those described in co-pending application Ser. No. 638,505, filed Dec. 8, 1975, now U.S. Pat. No. 4,233,179, and in U.S. Pat. No. 4,207,211. When these specific structures and catalyst compositions are utilized in steam-hydrocarbon reforming operations, the troublesome problem of the deposition of carbonaceous matter on the catalyst is significantly reduced.

BACKGROUND OF THE INVENTION

There are several types of endothermal reactions that are extensively utilized on a commercial basis. This invention relates to the steam-hydrocarbon reforming reaction for the production of Hydrogen, Carbon Monoxide and synthesis gas. The steam hydrocarbon reforming process is conducted in externally fired multitubular reactors using fixed catalyst beds. As less endothermal reaction occurs the temperature of the reaction is increased. Finally, the tube temperatures increase and may approach that of the furnace itself. Such temperatures, if reached, are extremely damaging to the metal tubes and costly replacement of the expensive alloy tubes may be required. Even if the tube temperatures do not reach this severity, the operation must be shut down with increasing frequency, the catalyst must be changed and considerable operating time and production is thus lost.

However, it has been discovered that if heat exchange can be improved from the furnace through the tubewall and to the catalyst within the tube, the problem of loss of activity can be minimized. This is especially true if the catalyst is on specific support shapes and if the catalyst is of the type disclosed in co-pending application Ser. No. 638,505, filed: Dec. 8, 1975, and in U.S. Pat. No. 4,207,211 dated June 10, 1978. The most logical explanation for the increased efficiency of this structure is that because of the low length to diameter ratio, a larger fraction of the surface of the interior walls of the support's axially aligned gas passages receive almost direct radiation from the tubewalls. The direct radiation (temperature in the 1200° F. to 2000° F. range) is at almost vertical incidence to the interior wall surface and thus the direct absorption of radiation is enhanced. This assures efficient heat exchange from the furnace hot gases and a low delta T between this gas temperature and the catalyst temperature. This makes for the good utilization of the heat in the furnace and a high energy efficiency.

Pressure drop through the steam-hydrocarbon reformer tubes has historically been a severe problem and one which in the past has been *a* frequent cause of catalyst failure. The unique catalyst structure of this invention overcomes much of this problem by providing more passages for the gas flowing through the tubes. These added channels or passages facilitate the gas transport through the tubes and thus decrease pressure drop.

SUMMARY OF THE INVENTION

This invention provides a new catalyst particularly useful for endothermal chemical reactions. More particularly, it encompasses a catalyst type having great importance to the steam-hydrocarbon reforming reaction. This reaction produces reactant gases for such important reactions as alcohol and ammonia synthesis. The hydrogen required for petrochemical and hydrogenation reactions is also prepared in this manner. The improved catalyst has two very important features, one geometric and the second catalytic composition. The geometric feature assures a multiplicity of gas passages or gas channels through the structure of such a length to diameter ratio, that most of the interior surface walls of the gas passages can be radiated directly from the hot walls of the reactor tubes. These surfaces, directly radiated, are coated with specific catalyst constituents comprising nickel or cobalt in concentrations of from about 6 to 30% by weight expressed as the metal oxide and which may be promoted with manganese, iron or barium oxides in predetermined and specified proportions. This combination of physical and chemical characteristics produces a unique and unusually efficient and long-lived catalyst. A further advantage of these catalysts is that they actually benefit from being installed into the converter tubes in a random rather than in an oriented or ordered manner. By so doing, the cost of charging is sharply reduced and the problem of bypassing at the tube walls is essentially eliminated.

BRIEF DESCRIPTION OF THE DRAWINGS

Referring now to the drawings.

DESCRIPTION OF THE PREFERRED EMBODIMENT

The basic purpose of the invention is to improve the economics of the synthesis gas operation by utilizing a catalyst having structural and chemical characteristics which [increases] *increase* catalytic activity catalyst life and which [tends] *tend* to reduce carbon deposition in the reactor tubes. The formation of carbon is especially severe when heavy hydrocarbons are processed (naptha or lighter) and when these hydrocarbons are exposed to a temperature below the optimum.

The structure of the catalyst 5 is such that radiation to all catalytic surfaces is so efficient that a high temperature is maintained even in the interior passages of the structure.

Figure 1:
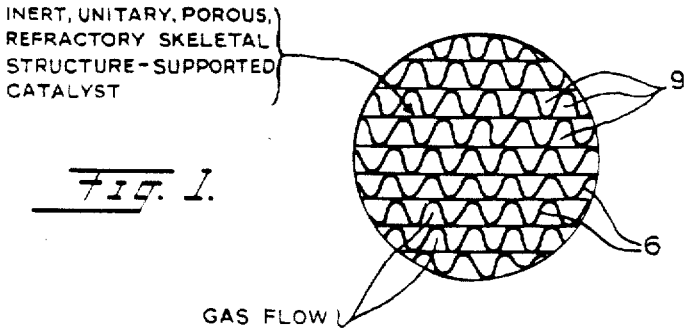
FIG. 1 is an end view of one of the preferred embodiments of this invention, illustrating the structure of the catalyst and particularly one way in which the multichannel concept can be designed. The outside shape is that of a cylinder.
Figure 2:
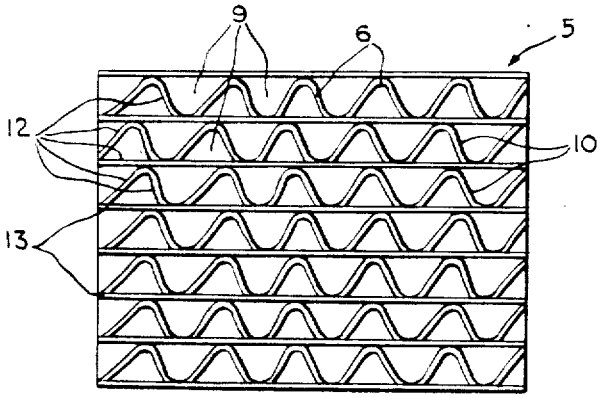
FIG. 2 illustrates in more detail the configuration of the gas passages, their relative positions, and the location of the catalytic components on the surfaces.
Figure 3:
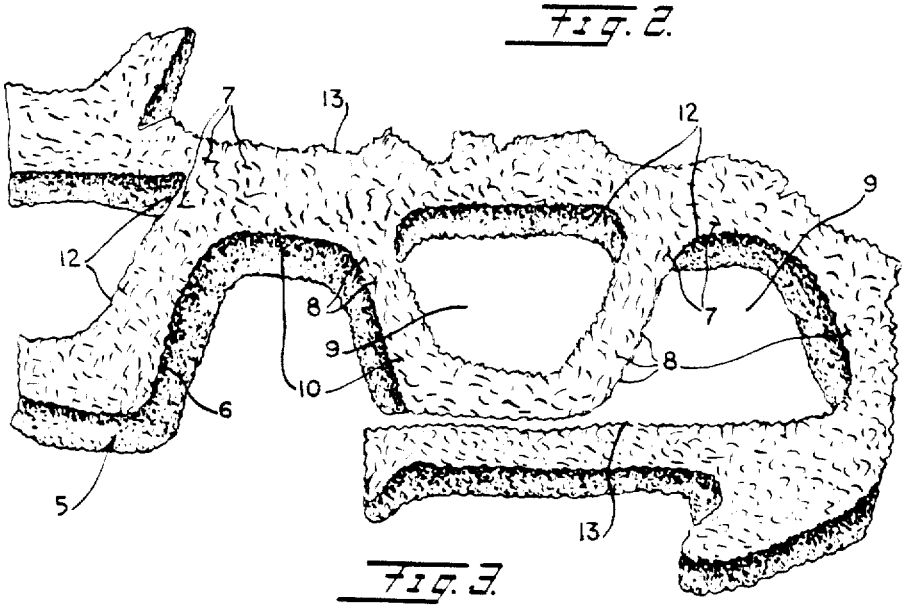
FIG. 3 illustrates in even more detail the presence of macropores which function as cells for catalyst anchoring and functioning.
Figure 6:
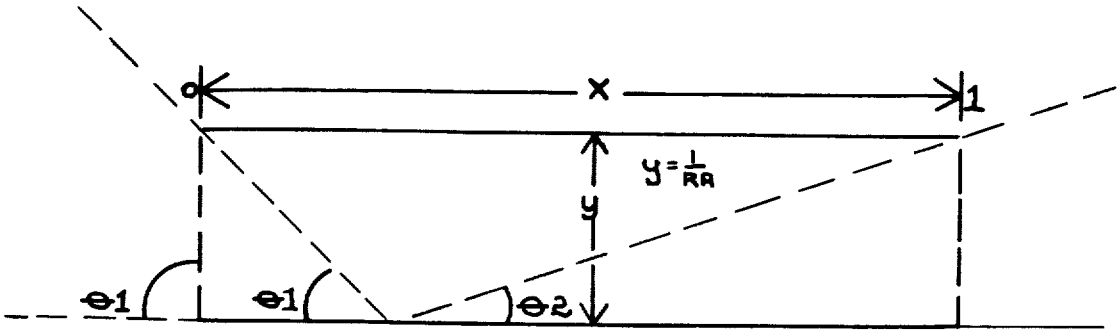
FIG. 6 is a diagrammatic representation of heat radiating rays (infra-red) striking the interior walls of the gas channels.

A part of the explanation given above can be better visualized by referring to FIGS. 3 and 6. FIG. 3 illustrates the refractory structure 6 as having macropores 8. The gas passages or gas channels 9 are defined by corrugations 10 interposed between horizontal layer 13. The catalytic constituent 12 should be thought of as a mossy or powdery coating adhering to all surfaces. Some pores, as for example 7, are of a larger size pore i.e., somewhat bigger than the macropores 8. This representation of the typical supported catalyst surface is generally accepted as being the profile of catalysts supported on "low surface area" supports. Such supports having a surface area as measured by BET of from 0.5–55 $m^2/gm$.

The role of FIG. 6 is essentially to make evident in a simple diagram the basic accomplishment of the invention of achieving radiant energy transfer from the hot reactor tubewalls to the catalytic surfaces and especially to the internal walls of the gas passages in *the* supported catalyst of this invention.

Figure 7:
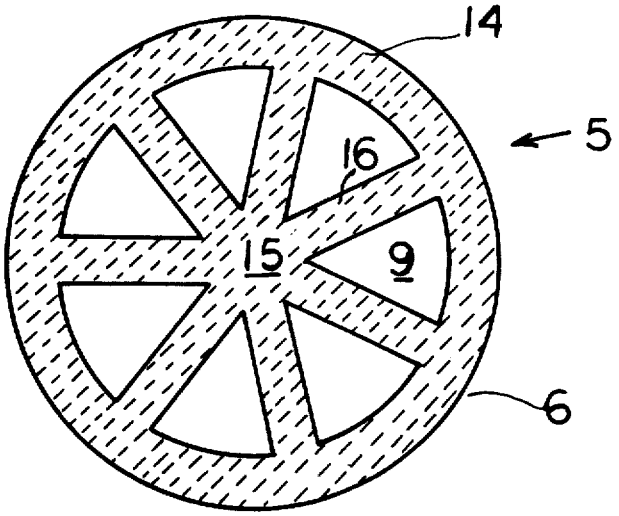
FIG. 7 is an end view of a catalyst structure in the form of a spoked wheel and is one of the most preferred forms of this invention. This spoked wheel fabricated of refractory material has a peripheral rim and a centrally located "hub" with seven radiating webs or spokes extending from the hub to the solid peripheral rim defining pie shaped gas passages.
Figure 8:
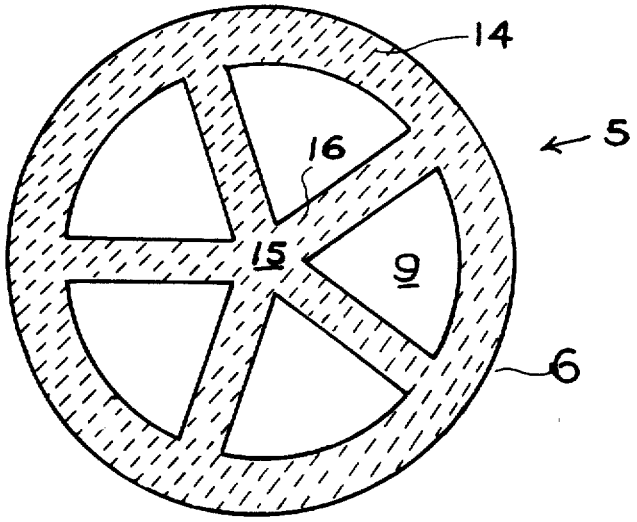
FIG. 8 is similar to FIG. 7 except that the circle is divided into five (5) equal segments instead of seven (7) as in FIG. 7.

FIGS. 7 and 8 are end views of catalysts in the form of spoked wheels and are the preferred forms of this invention. This form has a central "axle" or "hub" 15 with radiating webs or spokes 16 extending from the hub 15 to the solid rim 14.

FIG. 6 diagrammatically illustrates a theoretical postulate as to the operation of the catalyst of this invention under process conditions. The explanation involves certain assumptions. One of these assumptions involves the comparison of gas molecules with infra-red rays. The purpose of the explanation is to determine the effectiveness of the inner surface of the holes as a catalytic contact surface, i.e. the surface area provided by the inner walls of the gas passages 9 as contrasted with the effectiveness of the exterior surface encountered with solid cylinders, spheres and the like. Following this analogy, it is assumed that the interior surface of the holes would receive less radiation from the skin of the furnace tube than the exterior surface of the cylinder, i.e. that the middle of the gas channel would be less radiated than would be the area surrounding the gas [channels] *channel's* entrance. This lack of heat radiation was thought to be proportional to the length of the gas channel (height of the tablet). Further, since the reaction is endothermic and since heat must be supplied to the reactor by externally fired burners impinging on the skin of the tubes containing the catalyst, it is hypothesized that not only is the channel less radiated in the middle, but that due to the heat absorbing reaction in the middle of the channel, [sheilded] *shielded* by the ceramic catalyst wall from the external source of heat, (i.e. the radiating skin of the tubes) that it is also cooler in the middle portion of the gas channel. The postulate is, then, that catalytic activity and heat transfer of the interior surface of the walls of the gas channels are inversely proportional to the height of the tablet (length of the channel) and directly proportional to the diameter of the hole (width of the channel) and that therefore there is a relationship between the effectiveness of the catalyst pellet and the ratio of pellet height versus effective hole diameter (H:ID).

FIG. 6 was designed to demonstrate this and involves two parallel lines drawn to simulate the walls of the gas channel in the catalyst support. The sum of the two angles which could strike each point over the length of these lines is integrated as is shown in FIG. 6.

Now integrating $\Sigma(\theta 1+\theta 2)dx$ from $x=0$ to $x=1$

Where RA=H:ID (ratio of Height to Diameter of the Hole)

d=the derivative of the length x=the length

It is found that as RA approaches 0, Σ approaches 2 pi.

The symbol F1, as used herein, indicates the effectiveness of the catalytic surface both for catalytic activity and for heat transfer.

Therefore, $F1=0.63662\times ATAN$ $$[1/(RA-2.5)]+0.31831/(RA-2.5)\times ALOG[1+(RA-2.5)^2].$$

Where 0.63662 is a constant derived from the integration.

Where 0.31831 is a constant derived from the integration.

Where 2.5=the ratio of H:D of a $\frac{5}{8}\times\frac{1}{4}''$ ring.

This factor of 2.5 takes into consideration the turbulent whirlpool effect of gas molecules at the entrance of the hole opening (as contrasted with the straight line path of infra-red rays) and is in agreement with commercial experience to the effect that $\frac{5}{8}''\times\frac{5}{8}''\times\frac{1}{4}''$ rings exhibit an activity indicating that both the interior and exterior surfaces of the rings of this dimension are fully effective. Therefore, since the inner walls of the $\frac{5}{8}''$ ring having $\frac{1}{4}''$ diameter opening are apparently fully effective, this value is subtracted from the RA factor for the computation. When the various RA factors are from 1–10, that is (height to effective hole diameter ratios of 1:1 to 10:1) the following F1 (catalytic effectiveness) values are obtained.

TABLE I

| RA | F1 |
|---|---|
| 10 | .256 |
| 5 | .494 |
| 4 | .624 |
| 3 | .847 |
| 2 | 1.000 |

TABLE I-continued

| RA | F1 |
|---|---|
| 1 | 1.000 |

It is clear, then, from the theoretical values that a height to effective hole diameter (H:ID) ratio of 4:1 is equivalent to a +60% catalytic effectiveness. This value increases up to 100% as the ratio is lowered. Conversely, at values for H:ID ratios greater than 4, the catalytic effectiveness decreases from around 50% down to around 25%. The structure of the art (length equal to diameter) does not accomplish this because radiation is shielded from at least half of the interior catalytic surface.

The foregoing tends to explain how the purpose of this invention is accomplished, i.e., by a specific catalyst composition and a specific catalyst structure which provides much more catalytic surface than structures of the art and, because of the length to effective hole diameter (or width) considerations, assuring that heat is efficiently radiated to all of these surfaces maintaining the surfaces (catalyst entity) at a sufficiently high temperature to assure a high reaction rate for steam-hydrocarbon reforming and other endothermal chemical reactions.

The structures can be fabricated preferably from alpha alumina but other compositions can be employed and may be superior for certain applications. Examples of effective compositions other than alpha alumina include: metal aluminate spinel (as for example magnesium aluminate as represented by the formula R $Q_2O_4$ in which R represents one or more divalent metals (such as magnesium or zinc) and Q one or more trivalent metals, as for example, manganese, cobalt or chromium); alpha alumina containing calcium oxide, (or calcium aluminate cement); alpha alumina containing alkali salts such as $K_2O$, $Na_2O$, or $Cs_2O$; zirconium oxide; titanium oxide; magnesium oxide; thoria and ceria. Rare earth oxides can be used individually or as rare earth oxide mixtures as stabilizer mixtures for the foregoing. As has previously been demonstrated in our pending application Ser. No. 24,005, filed: Mar. 26, 1979, now U.S. Pat. No. 4,233,187, and its parent applications, Cordierite ($Mg_2Al_4Si_5O_{18}$)(magnesium alumino silicate) does not have sufficient activity for the steam hydrocarbon reforming reaction. The requirement is that the products have a surface area as measured by the BET procedure in the range of 0.5 to 55 $m^2/gm$; by physically strong; chemically and catalytically compatible with the reaction and reaction environment; chemically inert with the catalytic constituents under reaction conditions; and adaptable to at least one of many preparative and fabricating procedures. Originally spinel designated a mineral i.e., the double oxide of magnesium and aluminum viz. Mg $Al_2O_4$. As pointed out in U.S. Pat. No. 3,436,358, the double oxide can now be synthetically produced. Spinel is an extremely hard and physically a very resistant material having a hardness in the Moh's scale of about 8. It is therefore physically strong and resistant to spalling and disintegration. Further, it is resistant to reduction and reaction with the catalytic constituents under reaction conditions. As previously mentioned, while magnesium aluminate is the preferred carrier material, other divalent metals, as for example zinc, can replace all or part of the magnesium constituent and trivalent metals such as manganese [coablt] *cobalt* or chromium can represent the trivalent metals in the formula. We therefore designate these materials as metal aluminate spinels.

We have found, however, that the metal aluminate spinels are superior supports for the catalytic materials of this invention and are resistant to carbon formation, to physical disintegration, and to thermal shock.

The catalytic metals and metal oxides for this type catalyst are well known. Nickel and cobalt which may be incorporated by known methods onto the carrier in a concentration of from about 6 to 30% by weight (expressed as the oxides) are preferred. These catalytic agents may be further promoted by known promoters such as alkali metal oxides, or iron oxide and manganese oxide present in specific proportions.

When the alumina is idenfified as alpha, it is understood that this is determined by accepted X-ray procedures which fail to identify as much as 5% of other phases which may also be present. This, however, is accepted in crystallographic terminology, to indicate essentially all if not 100% alpha when a species is so identified. As given above in the ranges, the surface area should not significantly exceed 55 $m^2/gm$.

The preferred catalytic constituents employed are described in application Ser. No. 638,505, filed Dec. 8, 1975, now U.S. Pat. No. 4,233,179, and in U.S. Pat. No. 4,207,211. This disclosure teaches that the preferred composition contains nickel, manganese, iron, and optionally barium all as oxides. The barium oxide is beneficially added last. The basic principle for the impregnation is that either the iron or manganese can be added first but the nickel and the other promoter must be added subsequent to the first coating. The further requirement for a satisfactory catalyst is for the iron to manganese ratio not to exceed the value of two. The structures can be coated by immersion, spray coating or dipping *a* perforated basket containing the support structures into an impregnating solution.

The foregoing is offered as one explanation for the improved performance of the invention herein disclosed. However, an entirely separate explanation and analysis is presented also as follows:

The art has not recognized that geometric surface area provided by the interior walls of catalysts having multiple gas passages (multihole catalysts) does not contribute fully to catalytic activity in endothermic reactions. Our research has shown that while the exterior surface of the catalyst is available as sites for catalytic activity, that only the effective surface area provided by the interior gas passage walls contributes to catalytic activity. As a rule, we have found that with multiholed catalysts in endothermic reactions, that the geometric area of the exterior surface is directly proportional to catalytic activity and that catalyst efficiency is inversely proportional to the height (or length) of the catalyst pellet.

Furthermore, the effective surface area of the interior gas channel walls of multihole catalysts bears a relationship of table height (or length) to gas passage width or diameter (H:ID). The effective diameter is defined as the width of the opening of the gas passageway, when the area of said opening is expressed as *a* circle. This expression is necessitated since the gas passage openings may be circular, square, rectangular, trapezoidal, triangular, sinusoidal, etc. The exact configuration of the gas passage is immaterial. What does matter is the relationship of the height of the catalyst pellet to the effective internal diameter of the gas passage. In making these determinations, the following constants, utilized in the equations were derived from the following references.

Campbell, John M., and Huntington, R. L., "Heat Transfer and Pressure Drop in Fixed Beds of Spiral and Cylindrical Solids." Petroleum Refiner, Vol. 30, Number 12 (1951) pp. 127–133.

Leva, Max, "Pressure Drop Through Packed Tubes, Part I, A general Correlation" Chemical Engineering Progress, Vol. 43 (1947) pp. 549–54.

Leva, Max and Grummer, Milton, IBID. 1947) 633–648.

Leva, Max, IBID. pp. 713–718.

The values of these constants are:

$a = 0.373$ $b = 1.848$ $c = 0.1393$

Let:

FH = Fraction of particle taken up by hole(s)

FHS = FH

DT = Tube I.D. in which the particles are to be packed

A' = Area of particles with no hole(s)

F' = Fraction voids of particle with no hole(s)

$$a + b\frac{V'}{A'DT} = .373 + \frac{1.848V'}{A'DT}$$

A = Area of particles with hole(s)

V = Volume of particle with hole(s)

F = Actual fraction voids $$F = a + (1 - a)FH + (1 - FH)\frac{bV'}{A'DT} = .373 + 627FH + (1 - FH)\frac{1.848V'}{A'DT}$$

ACTIVITY COEFFICIENT FACTOR = ACF $$ACF = \frac{Area}{ft^3} = \left(1 - a - \frac{bV'}{DTA'}\right)\frac{A}{V'} = \left(.627 - \frac{1.848V'}{DTA'}\right)\frac{A}{V'}$$

PRESSURE FACTOR = PF $$PF = c(A/V)^{1.1}\frac{(1 - F)}{F^3} = .1393(A/V)^{1.1}\frac{(1 - F)}{F^3}$$

The Relative Activity Coefficient Factor is obtained by dividing the value of the ACF for the [standard] *sample* by the ACF value of the [sample] *standard*. Thus, ACF[®]$^R$ for the standard becomes one, whereas catalysts having an ACF greater than the standard have a value in excess of one. The ability of the catalyst to promote heat transfer into the reacting gas is essentially proportional to the activity factor. The Relative Activity Coefficient Factor [(ACF®)] *ACF$^R$*, and the Relative Pressure Factor [(PF®)] *PF$^R$* for each of the carriers illustrated in FIGS. 4, 5, 6 and 7 are as follows:

TABLE II

Figure 4:
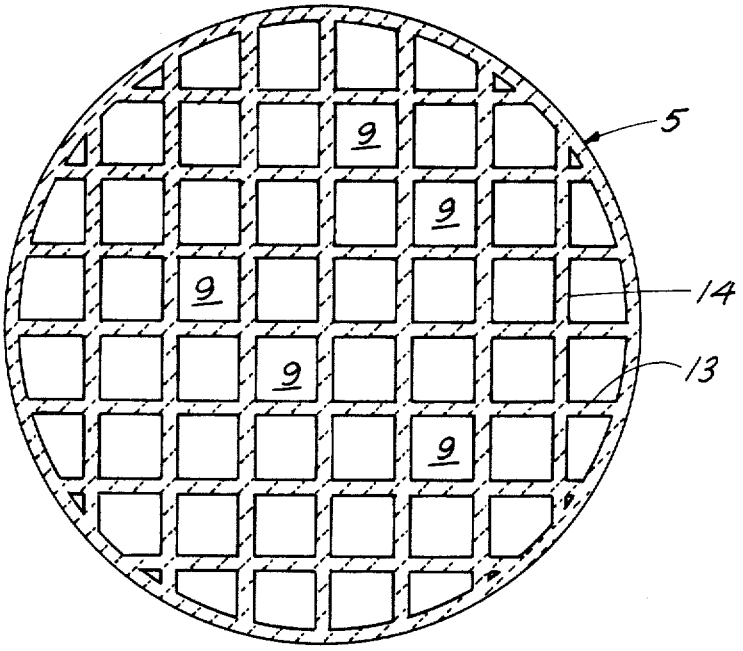
FIG. 4 is an end view of the honeycomb catalyst having square channels as an alternate to the sinusoidal type illustrated in FIG. 1.
Figure 5:
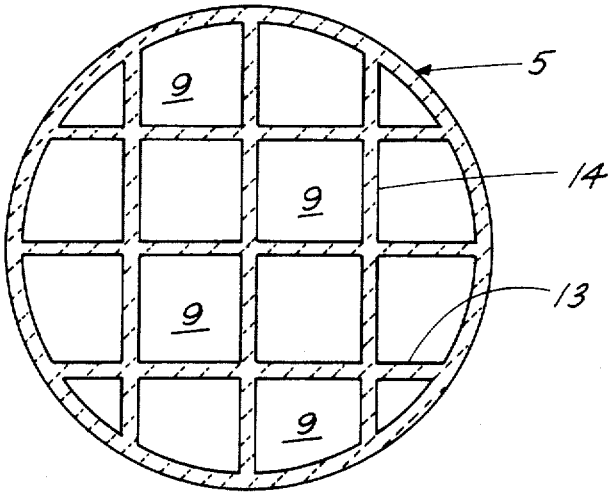
FIG. 5 is an end view also of the square sectioned cells but with larger wall thickness and opening size.

| | ACF$^R$ | | PF$^R$ | | [ACF$^R$ PF$^R$] | RATIO $\frac{ACF^R}{PF^R}$ | Diameter (in.) | Height (in.) | ID (in.) | No. of Holes |
|---|---|---|---|---|---|---|---|---|---|---|
| | (Based on a 2.9 inch ID tube) | | | | | | | | | |
| Standard | 1 | | 1 | | | | .625 | .375 | .25 | 1 |
| Honeycomb FIG. 4 | 2.48 | | [.47] | *.94* | [5.28] | *2.63* | .785 | .797 | .076 | 46 |
| Honeycomb FIG. 5 | [.206] | *2.16* | [.39] | *.70* | [5.62] | *3.09* | .625 | .250 | .135 | 11 |

It should be noted that the honeycomb of FIG. 4 produced the largest relative ACF[®]$^R$ and the largest value of the ratio of ACF[®]$^R$:PF[®]$^R$.

The conditions for the steam-hydrocarbon reforming reaction are well known and vary from temperatures of 800° F. to 1800° F. and pressures of 0 to 600 psig. As the pressure is increased, the severity of the conditions increase. Further, as the temperature increases, the severity of conditions to which the catalyst is subjected is increased.

It is standard practice, in the field, to increase the skin temperature of the catalytic reactor tubes to maintain a given rate of synthesis gas production. Therefore, the skin temperature of the tube at a particular localized point in the reactor can become critical and the lower the temperature that can be maintained at a specific catalytic activity, the lower the fuel consumption in the reformer and the less stress placed on the catalytic reformer tubes. The steam-to-carbon ratio varies in commercial practice [of] from 1.5:1 to 8:1. It is well known, of course, that as the length of the hydrocarbon feedstock chain is increased, the steam to carbon ratio must be increased to prevent and minimize carbon deposition. Neverless, the lower the steam-to-carbon ratio that can be maintained, the lower the steam requirement and as a result the lower the fuel requirement for the process.

SUPPORT PREPARATION

The following ingredients were carefully weighed out:

96.5 parts by weight of alpha alumina as a powder passing 100% through a 325 mesh screen.

10.5 parts by weight of Boehmite alumina (alpha alumina monohydrate).

50.0 parts by weight of recycle material (oversize from a previous batch).

Add all of the three ingredients above to a mix muller and start the mixer operating and grind or mill for about 10 minutes.

2. Prepare a nitric acid solution as follows:

25 parts by weight of distilled or demineralized water.

7.5 parts by weight of 61% nitric acid.

3. Add the solution of paragraph 2 to the milled powder of paragraph 1.

4. Mix mull the resultant moist paste for an additional 30 minutes, then add 6.2 parts by weight of distilled or demineralized water to the mixer and then mix mull for an additional period.

5. Transfer all the mixed product obtained to a continuous drier.

6. The dried granular material is next pulverized.

7. Blend the granular pieces with:

2.95 parts by weight of a lubricant.

8. Screen the product.

9. The screened product is now formed into cylinders, as shown in attached FIG. 7, 0.648 inches in diameter 0.293 inches high and with ribs 0.060 inches thick.

10. The supports from 9 are "program fired" at a temperature starting at 2200° F. and eventually reaching 2700° F. stepwise over a 4 hour period in an oxidizing atmosphere. The seven spoked wheel, corresponding generally to the catalyst shown in Example 7, was utilized throughout. The catalyst support had the following dimension *3:3*.

TABLE III

| DIAMETER IN INCHES | INNER DIMENSION | SPOKE THICKNESS | EQUIVALENT HOLE DIAMETER ID | RATIO H:ID | HEIGHT IN INCHES H |
|---|---|---|---|---|---|
| .648 | .498 | .060 | .1372 | 2.14 | .293 Example 1A |
| .648 | .498 | .060 | .1372 | 4.72 | .648 Example 1B |

The equivalent hole diameter, ID of each of the pie shaped gas passages 9, expressed as a circle was 0.1372" and was identical for both samples. The only difference, therefore, was the height or the length of the tablet and the ratio of H:ID. The longer of the samples (Example 1B) had a ratio of H:ID of 4.72:1 whereas the shorter of the samples was within the claimed range of 2.14:1.

EXAMPLE 1A

A series of the [catalysts] *catalyst* supports prepared according to the following prepration were immersed into a nickel nitrate solution and dried and calcined to convert the nickel nitrate to the oxide. The calcined material was then redipped in the nickel nitrate solution and this procedure was continued until a nickel concentration, expressed as the oxide, of 19.0% was obtained on the catalyst support. As previously indicated, this nickel[,] is present in the macropores 7 and 8 both on the inside and outer surfaces of the catalyst, i.e. in the gas channels 9 as well as the exterior walls of the cylinder 6.

This catalyst had the characteristics as shown in Table IV attached.

EXAMPLE 1B

This catalyst was prepared in the identical method as that of example 1A except that the length of this catalyst support was 0.648" rather than 0.293". The nickel was incorporated by repeated immersion into a nickel nitrate solution, followed by multiple dryings and calcinations. The final nickel concentration contained in the finished catalyst was 19.0%, expressed as the oxide.

EXAMPLE 2

This preparation has as its composition calcium aluminate as a binder and is one of the preferred compositions. The procedure for preparation is as follows:

1. The following ingredients are carefully weighed out:
   A. 33.9 parts by weight of calcium aluminate cement (the cement is in turn comprised of 6.1 parts CaO and 27.8 parts ($Al_2O_3$).
   B. 66.1 parts of $Al_2O_3$ derived from Al $(OH)_3$, alumina hydrate which is approximately 61% $Al_2O_3$.
   C. 25.0 parts by weight of recycle material.

Add all of the three ingredients to a mix muller and mix the material for about 10 minutes.

2. [weight] *weigh* out 25 parts by weight of distilled water.
3. Perform operations as set forth in paragraphs 3 through 6 of Example 1.
4. Blend the product of paragraph 6 with 3 parts of powdered graphite.
5. Operations as described in paragraphs 8, 9 and 10 are performed as called for in "Support Preparation." The calcined 7 spoked cylinders are impregnated by immersing a quantity into a nickel nitrate solution. The immersed supports are dried and calcined. This procedure is repeated until the nickel oxide concentration of the finished catalyst is in the range of 19%. The calcination temperature is in the range of 650° F.-750° F. The finished catalyst contained:

| NiO | Calcium Aluminate | Alpha Alumina |
|---|---|---|
| 19% | 20.25% | 60.75% |

On an analysis basis, the catalyst composition was as follows:

| NiO | CaO | $Al_2O_3$ |
|---|---|---|
| 19% | 4% | 77% |

EXAMPLE 3

This preparation has magnesium aluminate spinel as the support. Magnesium aluminate spinel has both chemical and physical properties which are unique and result in a support having high thermal resistance to the catalyst applied to the support migrating into the support interstitially. For these reasons it is also a highly satisfactory support.

The procedure for its preparation is as follows:

The following ingredients are carefully weighed out:

28.3 parts by weight of magnesite ($M_gO$).

63.7 parts by weight of alpha alumina having a surface area of 10 to 15 $m^2/gm$.

8.0 parts acid reactive alumina such as Boehmite (alpha alumina monohydrate).

25.0 parts of recycle material.

Add all of the four ingredients to a muller and mill for about 10 minutes.

2. Prepare a solution comprising 140 parts distilled or demineralized water and 17 parts 61% nitric acid. Stir to make uniform.
3. Add 32 parts by weight of the nitric acid solution of paragraph 2 above to the milled powder.
4. Mix mull the resultant moist paste and then add about 6 parts by weight of distilled or demineralized water to the mixer and then mix mull for an additional 20 minutes.
5. Perform operations as set forth in paragraphs 5 through 7 of Example 1.
6. Perform operations as specified in paragraphs 8 and 9 of the "Support Preparation".
7. The shaped supports thus produced in the form of 7 spoked cylinders are "program fired" stepwise at temperatures of from 2200° F. to 2650° F. for a period of 4 hours in an oxidizing atmosphere.
8. The supports, again are impregnated as previously described by immersion in a nickel nitrate solution, followed by drying and calcination. This procedure is repeated until the nickel oxide concentration of the finished catalyst is in the range of 19%. The final composition of the catalyst after impregnation, drying and calcination is as follows:

| NiO | MgO | $Al_2O_3$ |
|---|---|---|
| 19% | 22.9% | 58.1% |

The magnesium oxide and the aluminum oxide constituents are present as a magnesium aluminate spinel. Alternately, the composition of this example can be spray dried with proper adjustment of the moisture content of the milled powder. Additionally, the shapes can also be varied as preferred for the operation in which the support is to be used, and in the method of forming of the structures; for example, by dry pressing, wet pressing or extruding.

EXAMPLE 4

The composition and procedure of this example produces a relatively high surface area structure which has special desirable properties. The composition includes rare earths and the method of developing the alumina gel structure is changed so that there are major differences from the former examples. The preparative procedure is as follows:

1. Carefully weigh out the following ingredients:
   2.1 parts of finely divided silica.
   7.0±1 parts of mixed rare earths as their nitrates (mixed rare earth have a nominal composition of 60% $La_2O_3$, 15% $CeO_2$, 17.5% $Nd_2O_3$ and 7.0% $Pr_8O_{11}$.
   91.1 parts of Boehmite alumina such as Boehmite (alphamonohydrate).
   Mill the three ingredients in a mix muller.
2. [weight] *weigh* out 75 parts of distilled or demineralized water.
3. Add the distilled water of a paragraph 2 to the milled powder of paragraph 1.
4. Perform operations as described in paragraphs 4, 5 and 6 of "Support Preparation."
5. Blend the product of paragraph 6 in a blender in the ratio of 100 parts powder to 3 parts of aluminum stearate and 1 part aluminum powder.
6. The instructions given in paragraphs 8 and 9 of "Support Preparation" are followed as given therein.
7. The supports in the form of 7 spoked cylinders from 9 are "program fired" stepwise through the range of from 250° to 1250° F. over 8 hours, then are continued at 1250° F. for an additional 4 hours making a total of 12 hours of calcining. The nitrate anion of the rare earths is decomposed during this calcining. The firing is conducted in an oxidizing atmosphere. The shaped support structures are then immersed for multiple dips in a nickel nitrate solution as previously indicated. After dipping, drying and calcination, the final metals content of the catalysts is as follows:

| NiO | Rare Earth Oxide (ReO) | Silica Oxide SiO | $Al_2O_3$ |
|---|---|---|---|
| 19% | 5.67% | 1.7% | 72.6% |

EXAMPLE 5

A catalyst was prepared according to the procedure set forth in Example 4, except that alpha alumina having a surface area in the range of 10 to 15 $m^2/gm$ such as that used in Example 3 was substituted for the Boehmite (alpha monohydrate) such as that used in Example 4. Again, the mixture of the rare earth metal nitrates of lanthanide series, such as that used in Example 4 was mulled with the other constituents in the same concentrations. As a result, the finished catalyst, after immersion in nickel nitrate solutions as previously indicated, had the same general composition i.e.,

| NiO | Rare Earth Oxides (Re) | SiO | $Al_2O_3$ |
|---|---|---|---|
| 19% | 5.67% | 1.7% | 72.6% |

The difference in the two preparations was in the surface area of the finished catalyst as is shown in Table III. The surface area for Example 4 was 53.7 $m^2/gm$ whereas the surface area of the catalyst of Example 5 was 11.5 $m^2/gm$. After testing, the surface area of the catalyst of Example 4 had been reduced somewhat to 47.52 $m^2/gm$ whereas the surface area of the catalyst in Example 5 actually showed an increase, (within experimental error) of 15.7%.

EXAMPLE 6

Another catalyst was prepared in accordance with the steps of Example 4, except that the rare earth metal nitrate solution was omitted from the preparation. The finished catalyst contained

| NiO | SiO | $Al_2O_3$ |
|---|---|---|
| 19% | 1.7% | 79.3% |

These catalysts, upon firing, shrank considerably since they were not stabilized by the rare earth oxides. Thus the particle [sizes] *size* of these catalysts was less than those of the other examples. Each of the catalysts were tested under identical conditions. 200 cc of the catalyst pellets were placed in the reactor and natural gas was fed over the catalyst at atmospheric pressure and at a dry gas feed rate of 200 volumes of gas per volume of catalyst per hour. The steam to gas ratio was maintained at 3.0:1. Each of the catalysts were tested at temperatures of 1000°, 1200°, 1400° and 1600° F.

Essentially, all of the catalysts were identical or essentially identical in nickel concentration. The carriers were of the same general configuration except that the catalyst of Example 1B had a height of 0.648 inches, versus the height of 0.293 inches for the remaining catalyst. The equivalent hole diameter of each of the pie shaped gas passages 9 expressed as a circle, [were] *was* 0.1372 inches and therefore was identical for all samples. The only difference therefore was in the height or the length of the tablet and the ratio of H:ID. The longer of the samples i.e., the sample of Example 1B had a ratio of 4.72:1, outside of the claimed range whereas the shorter of the samples was within the claimed range of 2.14:1. The carrier composition of Example 1A and 1B [were] *was* identical. Some of the other samples varied. Thus, the carrier composition of Example 3 was magnesium aluminate. In Examples 4 and 5 the carrier composition was stabilized by the addition of almost 6% of rare earth oxides of the lanthanide series. The results of the testing [is] *are* shown in attached Table IV.

The activity can best be seen by noting the methane leakage at various temperatures. Looking, for example, at Examples 1A i.e., the shorter catalysts having the H:ID ratio in the claimed range versus Example 1B having the H:ID ratio outside of the claimed range, the methane leakage at 1000° F. was 25.59 versus 41.5. At 1200° F. the methane leakage for the catalyst 1A was 9.79 whereas the catalyst of Example 1B was at 21. Again, the superiority of the catalyst expressed as the lower methane leakage became clear at temperatures of 1400° F. and 1600° F. respectively.

The amazing situation was that at 1000° F. the methane leakages of Examples 2, 3, 4 and 5 were almost identical. The methane leakage of Example 6, however, was slightly lower. Again, the methane leakage for Examples 2, 3, 4 and 5 were almost identical to the methane leakage for Example 1A, which was almost half of the methane leakage of Example 1B. Again, the methane leakage of Example 6 appeared to be about half that of the other catalyst.

At 1400° F. the superiority of the catalyst supported on the various carriers was maintained so long as the H:ID ratio was within the preferred range. Again, this was demonstrated at 1600° F. wherein the methane leakage for the seven spoked catalyst of different support composition maintained a superiority so long as the H:ID ratio remained the same. It will be remembered however, that in the parent applications it was demonstrated that the Cordierite compositions i.e., $Mg_2Al_4Si_5O_{18}$ (magnesium alumino silicate) produced a less efficient catalyst for this reaction. We have demonstrated however, in Table IV, that magnesium aluminate produces good results and that alumina catalyst supports can be promoted with rare earth oxides with good results. The surface area of the catalyst prior to testing of Example 4 was 53.7 while the surface area of the catalyst prior to testing of Example 5 was 11.5 $m^2/gm$. This was due to the different aluminum oxide constituents utilized in preparing the catalyst. After testing, the surface area of the tested catalyst of Example 4 was still almost 50 $m^2/gm$. The interesting point is that the activities of each of these catalysts at 1000° F., at 1200° F., at 1400° F. and at 1600° F. were almost identical. It would have been predicted that the substantial difference in micro surface area of catalyst 4 would have produeed a much more active catalyst. Such was not the case. The failure of the catalyst to lose surface area under high temperature conditions was due to the

TABLE IV

| | Example 1A & 1B 7 spoked wheels OD .648" | | Example 2 7 spoked wheels OD .648" Ht. .293" Alumina/ | Example 3 7 spoked wheels OD .648" Ht. .293" | Example 4 7 spoked wheels OD .648" Ht. .293" Alumina | Example 5 7 spoked wheels OD .648" Ht. .293" Alumina | Example 6 7 spoked wheels OD .648" |
|---|---|---|---|---|---|---|---|
| | 1A Ht. .293" H:ID 2.14 | 1B Ht. .648" H:ID 4.72 | Calcium Oxide H:ID 2.14 | Magnesium Aluminate H:ID 2.14 | Rare Earth Oxide H:ID 2.14 | Rare Earth Oxide H:ID 2.14 | Ht. .293" Alumina H:ID 2.14 |
| Crush lbs./DWL | | | | | | | |
| Carrier | 59 | 120 | 40 | 48 | 34 | 45 | 37 |
| Dipped | 66 | 116 | 49 | 75.5 | 51 | 66 | 64.5 |
| Density (CBD) | | | | | | | |
| Carrier, #/CF | 52.1 | — | 32.0 | 41.0 | 39.6 | 51.1 | 47.9 |
| Dipped, #/CF | | — | 54.9 | 53.8 | 52.3 | 63.9 | 60.8 |
| $H_2O$ Pickup | | | | | | | |
| Carrier, % | 21.0 | — | 39.0 | 29.7 | 33.4 | 25.4 | 27.0 |
| Surface Area | | | | | | | |
| Carrier, $m^2/g$ | 1.64 | 2.37 | 6.60 | 2.35 | 22.6 | 1.38 | 1.57 |
| Catalyst, $m^2/g$ | 2.71 | 2.3 | 24.6 | 9.4 | 53.7 | 11.5 | 14.1 |
| Pore Volume > (350 Å) | | | | | | | |
| Carrier, cc/g | 0.22 | 0.23 | 0.47 | 0.32 | 0.34 | 0.25 | 0.29 |
| Catalyst, cc/g | 0.16 | 0.16 | 0.38 | 0.25 | 0.23 | 0.17 | 0.19 |
| NiO Crystallite Size, Å | 250 | 325 | 400 | 150 | 150 | 210 | 210 |
| % $CH_4$ Leakage 1600° F. | 1.14 | 5.10 | 1.13 | 0.67 | 0.75 | 0.96 | 0.17 |
| 1400° F. | 4.48 | 12.4 | 3.07 | 1.90 | 2.18 | 2.20 | 0.91 |
| 1200° F. | 9.79 | 21.0 | 10.78 | 8.98 | 9.37 | 9.11 | 5.25 |
| 1000° F. | 25.59 | 41.5 | 26.90 | 24.62 | 25.5 | 24.56 | 18.94 |
| Properties After Activity Test | | | | | | | |
| Crush (Reduced) lbs/DWL | 82 | 116 | 52 | 81.0 | 83.0 | 49.5 | 40.5 |
| % C | 0.08 | 0.139 | 0.116 | 0.097 | 0.080 | 0.163 | 0.181 |
| Surface Area, $m^2/g$ | 1.3 | 2.4 | 2.0 | 3.2 | 47.5 | 15.7 | 12.3 |
| Pore Volume > (350 Å) cc/g | 0.15 | 0.16 | 0.15 | 0.23 | 0.20 | 0.37 | 0.23 |
| Ni Crystallite Size (Å) | 140 | 290 | 325 | 210 | 200 | — | 165 |
| Activity Test Conditions | | | | | | | |
| Catalyst Volume (cc): | 200 | | | | | | |
| Feedstock: | Natural Gas | | | | | | |
| Pressure: | Atmospheric | | | | | | |

TABLE IV-continued

| | Example 1A & 1B 7 spoked wheels OD .648" | | Example 2 7 spoked wheels OD .648" Ht. .293" Alumina/ | Example 3 7 spoked wheels OD .648" Ht. .293" | Example 4 7 spoked wheels OD .648" Ht. .293" Alumina | Example 5 7 spoked wheels OD .648" Ht. .293" Alumina | Example 6 7 spoked wheels OD .648" |
|---|---|---|---|---|---|---|---|
| | 1A Ht. .293" H:ID 2.14 | 1B Ht. .648" H:ID 4.72 | Calcium Oxide H:ID 2.14 | Magnesium Aluminate H:ID 2.14 | Rare Earth Oxide H:ID 2.14 | Rare Earth Oxide H:ID 2.14 | Ht. .293" Alumina H:ID 2.14 |
| Dry Gas Feed Rate (1/hr.) | 200 | | | | | | |
| Steam/Gas Ratio: | 3.0/1 | | | | | | |

*"% Methane Leakage" is a term of convenience. The lower the leakage the more complete is the reaction. Thus a low "methane leakage" is an indication of high activity.

stabilizing effect of the rare earth oxide promoter. Since the beginning preparation of Example 5, had a low surface area, such advantage was not achieved. However, insofar as activity was concerned there appeared to be no essential difference. This demonstrates therefore that this invention requires a cylindrical refractory support having two or more gas passages extending axially therethrough and having a catalytically active amount of group VIII metal oxide deposited thereon. Specifically, we have found that the catalyst should have a Relative Activity Coefficient Factor (AC[R]*F*[®]$^R$),(as defined herein) and a Relative Pressure Factor (PF[®]$^R$) (as defined herein), in excess of that of a standard ring, and the *(*ACF[®]$^R$*)* should be in excess of [1] *1.15* the ratio of *(*ACF[®]$^R$*)* to PF[®]$^R$ should be in excess of [1]*1.125*. Further, we have found tht the height (H) of the catalyst support should bear a relationship to the effective internal diameter (ID) of each of said gas passages of said support. Therefore, the ratio of H:ID of said catalyst support should be less than 4:1. This critical ratio has been experimentally demonstrated in both bench and pilot scale studies.

The geometric or macro surface area, as demonstrated in these examples and particularly the effective surface area of the walls of the interior gas passages 9 as shown herein do have a substantial effect on the activity of the reaction. Thus, as is shown, there is a substantial difference in activity between Examples 1A and 1B. This is also true when the catalyst of Example 1B is compared with the catalysts of Examples 2 through 6.

It is felt therefore, that the specific height to effective internal diameter of ratio (H:ID) for multiholed catalysts when used in endothermic reactions of this type is of relatively wide spread application, and the geometric features of this invention are applicable to a wide variety of refractory supports. The metal aluminate spinels offer excellent supports so long as the metal forming the spinel does not migrate under reaction conditions or at reaction temperatures.

Many modifications will occur to those persons skilled in the art from the detailed description presented herein, which was meant to be exemplary in nature and nonlimiting, except so as to be commensurate in scope with the scope of the appended claims.

We claim:

1. A [hydrocarbon reforming] catalyst, comprising a [cylindrical] *cylindrical* refractory support [selected from the group consisting of aluminum oxide, magnesium oxide, calcium oxide and metal aluminate spinels, and] having two or more gas passages extending axially therethrough from one end to the other and a catalytically-active metal comprising nickel or cobalt oxide deposited thereon [in a concentration of 6% to 30% by weight, expressed as the metal oxide], said catalyst having a Relative Activity Coefficient Factor (ACF[®]$^R$) and a Relative Pressure Factor (PF[®]$^R$) being in excess of that when compared to a standard ring, said ACF[®]$^R$ being in excess of [1] *1.15* and the ratio of ACF[®]$^R$ to said PF[®]$^R$ being in excess of [1:1] *1.25:1*, the Height (H) of said support bearing a relationship to the effective internal diameter of each of said gas passages (ID), the ratio of H:ID being less than 4:1.

2. A [hydrocarbon reforming] catalyst, as defined in claim 1, in which said [cylindrical] *cylindrical* refractory support is in the form of a spoked wheel, having a peripheral rim, a centrally-located hub and a plurality of radially-extending spokes, defining pie-shaped gas passages.

3. A [hydrocarbon reforming] catalyst, as defined in claim 1, in which said support has a surface area in the range of from 0.5 to 55 $m^2$/gm.

*4. A catalyst, as defined in claim 1, in which said catalytically-active metal is nickel oxide.*

*5. A catalyst, as defined in claim 1, in which said catalytically-active metal is cobalt oxide.*

*6. A catalyst, as defined in claim 1, in which said catalytically-active metal is present in a concentration of from 6% to 30% by weight, expressed as the metal oxide.*

*7. The catalyst, as defined in claim 1, in which said refractory support consists essentially of aluminum oxide.*

* * * * *

UNITED STATES PATENT AND TRADEMARK OFFICE

CERTIFICATE OF CORRECTION

PATENT NO. : Reissue 32,044

DATED : December 3, 1985

INVENTOR(S) : Kenton Atwood and James H. Wright

It is certified that error appears in the above-identified patent and that said Letters Patent is hereby corrected as shown below:

Column 3, line 20, should read --which increase catalytic activity and catalyst--.

Column 3, line 37, should read --are of a larger size, i.e.--.

Column 3, line 41, should read --have--.

Column 4, line 15, "of" should read --to--.

Column 4, line 47, "a 5/8" x 1/4" ring" should read --5/8" x 3/8" x 1/4" ring--.

Column 4, line 52, "5/8" x 5/8" x 1/4" rings" should read --5/8" x 3/8" x 1/4" rings--.

Column 5, line 49, "by" should read --be--.

Column 5, line 67, a comma should appear after "manganese."

Column 6, line 15, should read --identified--.

Column 6, line 59, "table" should read --tablet--.

Column 7, line 47, --F' = -- should appear before "A + B x $\frac{V'}{A'DT}$ = "

Column 7, line 56, "627 FH" should read --.627 FH--.

Column 7, line 63, "$\alpha$" should read --a-- and "DTA'" should read --A'DT--.

Column 7, line 66,"DTA'" should read --A'DT--.

Column 8, line 17, "Figs. 4, 5, 6 and 7" should read --Figs. 4 and 5--.

UNITED STATES PATENT AND TRADEMARK OFFICE

CERTIFICATE OF CORRECTION

PATENT NO. : Reissue 32,044

DATED : December 3, 1985

INVENTOR(S) : Kenton Atwood and James H. Wright

It is certified that error appears in the above-identified patent and that said Letters Patent is hereby corrected as shown below:

Column 8, line 54, should read --must be increased to minimize carbon deposition--.

Column 8, line 55, "neverless" should read --nevertheless--.

Column 9, line 22, a comma should appear after "diameter."

Column 9, line 27, "Example 7" should read --Fig.7--.

Column 9, lines 28 and 29, should read --following dimensions-- and "3:3" should be stricken.

Column 9, line 51, "following prepration" should read --above preparation--.

Column 10, line 25, "6" should read --3--.

Column 10, line 60, should read --1.-- before "The following ingredients."

Column 11, lines 36 and 37, "support is to be used, and in the method" should read --support is to be used by varying the method--.

Column 11, line 55, "Boehmite," first occurrence, should read --reactive--.

Column 11, line 56, "(alphamonohydrate)" should read --(alpha monohydrate)--.

Column 11, line 60, "a" should be stricken.

Column 11, line 64, "6" should read --4--.

Column 12, line 15, "ReO" should read --REO--, and "SiO" should read --$SiO_2$--.

Column 12, line 27, --the-- should appear before "lanthanide series."

UNITED STATES PATENT AND TRADEMARK OFFICE

CERTIFICATE OF CORRECTION

PATENT NO. : Reissue 32,044

DATED : December 3, 1985

INVENTOR(S) : Kenton Atwood and James H. Wright

It is certified that error appears in the above-identified patent and that said Letters Patent is hereby corrected as shown below:

Column 12, line 34, "Re" should read --REO-- and "SiO" should read --$SiO_2$--.

Column 15, line 41, "reaction" should read --catalyst--.

Column 15, line 46, "of" should be stricken.

Column 10, line 61, "magnesite (MgO)" should read --magnesia (MgO)--.

Column 11, line 54, the parentheses should be closed after --$Pr_8O_{11}$--.

Signed and Sealed this

*Twelfth* Day of *August 1986*

[SEAL]

*Attest:*

DONALD J. QUIGG

*Attesting Officer*

*Commissioner of Patents and Trademarks*